Dec. 30, 1958        R. S. LONG        2,866,680
ALKYL PYROPHOSPHATE METAL SOLVENT EXTRACTANTS AND PROCESS
Filed March 2, 1955        7 Sheets-Sheet 1

INVENTOR.
RAY S. LONG
BY
ATTORNEY.

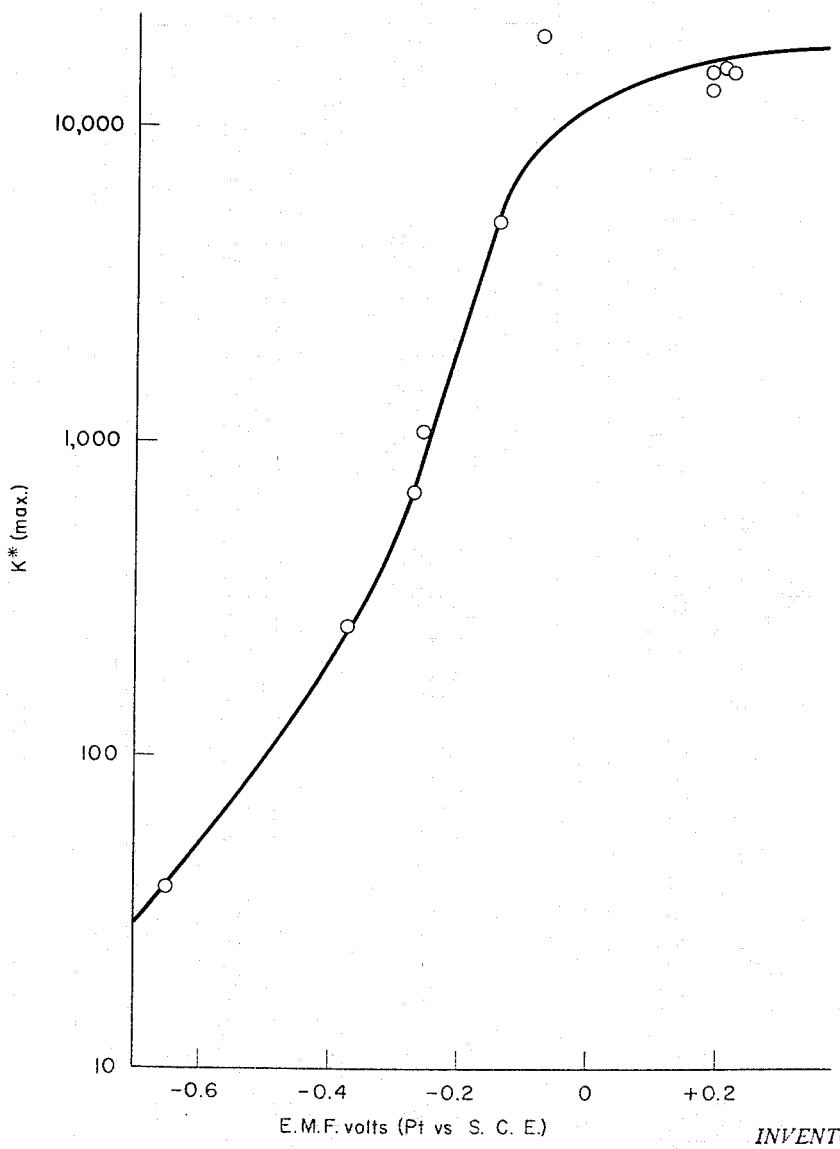
Fig. 2. K*(max.) vs Oxidation Potential for the Distribution of Uranium Between Phosphoric Acid and Octyl Pyrophosphoric Acid Extractants at 25° C.

Dec. 30, 1958

R. S. LONG 2,866,680

ALKYL PYROPHOSPHATE METAL SOLVENT EXTRACTANTS AND PROCESS

Filed March 2, 1955

INVENTOR.
RAY S. LONG

BY
Roland A. Anderson
ATTORNEY.

Dec. 30, 1958 R. S. LONG 2,866,680
ALKYL PYROPHOSPHATE METAL SOLVENT EXTRACTANTS AND PROCESS
Filed March 2, 1955 7 Sheets-Sheet 4

Isotherms for the Distribution of Uranium Between Nitric Acid Leach Solution and Octyl Pyrophosphoric Extractant

INVENTOR.
RAY S. LONG
BY
ATTORNEY.

INVENTOR.
RAY S. LONG
BY
ATTORNEY.

Dec. 30, 1958        R. S. LONG        2,866,680
ALKYL PYROPHOSPHATE METAL SOLVENT EXTRACTANTS AND PROCESS
Filed March 2, 1955        7 Sheets-Sheet 7
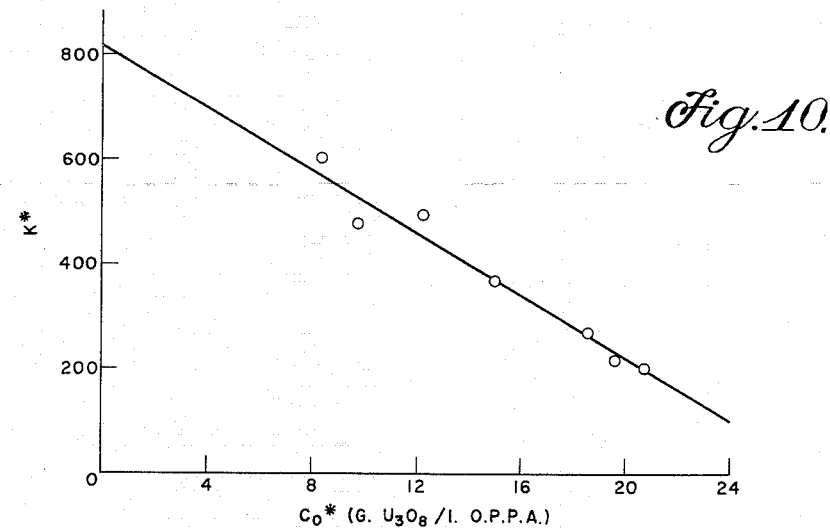
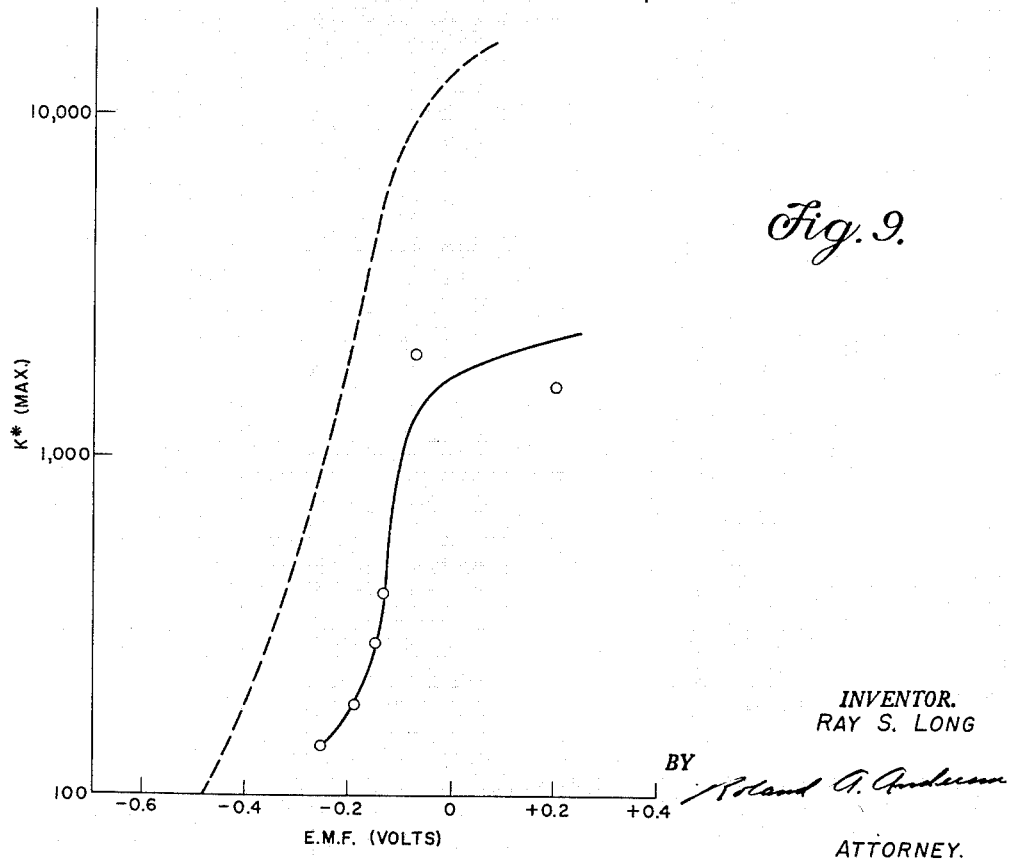
INVENTOR.
RAY S. LONG
BY
ATTORNEY.

2,866,680
ALKYL PYROPHOSPHATE METAL SOLVENT EXTRACTANTS AND PROCESS

Ray S. Long, Concord, Calif., assignor, by mesne assignments, to the United States of America as represented by the United States Atomic Energy Commission Application March 2, 1955, Serial No. 491,798

19 Claims. (Cl. 23—14.5)

This invention relates to solvent extraction processes for recovering and purifying metals and, more particularly, to superior extractants employed in an improved process for recovering and purifying various metals.

In the copending application of Richard H. Bailes and Ray S. Long, Serial No. 335,276, filed February 3, 1953, there is disclosed a solvent extraction process employing alkyl phosphate esters, alkyl phosphites, and alkyl phosphonates for recovering a variety of metals including uranium and thorium from acidic phosphatic solutions. As disclosed therein, the metals to be recovered and purified are selectively extracted from an acidic phosphatic solution using an extractant phase containing one of the afore-mentioned extractants and, usually, an organic diluent solvent. Generally, extraction of ions having the greatest numbers of positive charges is highly favored over less positively charged ions. Accordingly, a preferential extraction of particular materials into the extractant phase is obtainable with this previous process. The preferentially extracted materials are subsequently recovered as a purified product from the solvent extractant phase by various alternative methods.

Now, we have discovered that greatly superior results may be obtained in solvent extraction processes for the recovery of metal values, however, with a great variety of acidic solutions, particularly mineral acid solutions, by employing therein extractants of the general class of organic pyrophosphates, particularly the dialkyl esters of pyrophosphoric acid. These new extractants have extraction coefficients of the order of 10 to 100 times those of the extractants employed in the aforesaid copending application. Greater selectivity and more efficient extraction are also obtained therewith. These novel solvent extraction processes possess a remarkable utility for recovering highly strategic metal values from very low grade domestic sources.

It is therefore an object of the invention to provide improved extractants for use in solvent extraction processes for recovering and purifying metal values.

Another object of the invention is to employ organic pyrophosphoric acid esters as extractants in solvent extraction processes for recovering and purifying metal values.

Another object of the invention is to provide solvent extraction processes, wherein an extractant phase comprising an alkyl pyrophosphoric acid in admixture with an organic diluent solvent is employed to extract metal values from acidic or neutral solutions thereof.

Still another object of the invention is to provide a solvent extraction process, wherein an extractant phase comprising an alkyl pyrophosphate in admixture with an organic diluent solvent is employed to extract metal values from acidic aqueous solutions thereof and wherein the metal value is finally recovered from the extractant phase.

A further object of the invention is to provide a process for recovering metal values including uranium and thorium from acidic or neutral aqueous solutions thereof, wherein an alkyl pyrophosphate in admixture with an organic diluent is employed to preferentially extract such metal values from the said solution.

Other objects and advantages of the invention will become apparent by consideration of the following description taken in conjunction with the accompanying drawings, of which:

Figure 2 is a graphical illustration of beneficial results obtained by lowering the oxidation state of the solution;

Figure 9 is a graphical illustration of the relationship between oxidation state and the relative extractability of uranium from concentrated and dilute phosphoric acid solutions; and Figure 10 is a graphical illustration of the relation between $K^*$ and $C^*_0$ for the extraction of uranium from a hydrochloric acid leach solution by a pyrophosphoric acid extractant.

Figure 1:
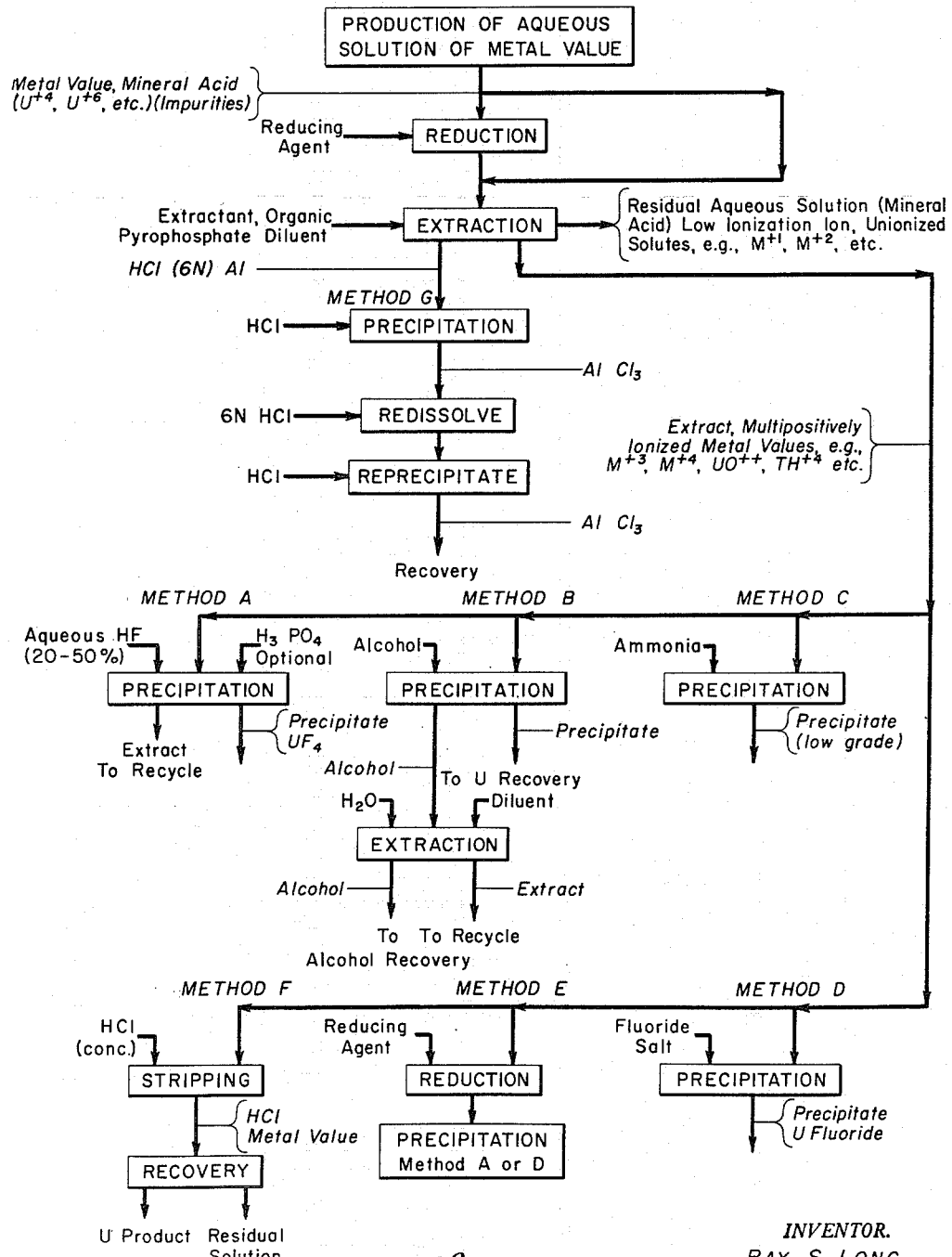
Figure 1 is a flow sheet illustrating the process of the invention.

In general, with reference to Fig. 1 of the drawing, the process of the invention contemplates the treatment of acidic aqueous or neutral solutions whereby certain metal values may be concentrated, purified and/or recovered. Mineral acid solutions of the material to be treated are particularly adapted to the processes of the invention and favorable results have been obtained with acidic phosphatic (phosphoric acid) nitric, hydrochloric, sulfuric acid solution (i. e., an aqueous phase) of the metal values derived in the treatment of a wide variety of ores, and other solids. Other mineral acid solutions and mixtures with those noted above should likewise be suitable provided the metal value is soluble therein and no excessive complexing or other deleterious action results therefrom.

Such an acidic solution can be obtained by any suitable means such as the treatment of ores with leaching acid, dissolution of any solid material in any of the indicated acids, appropriate acidification of solutions already formed by various other means such as basic leachings, etc., or the solution may be obtained in an intermediate stage of manufacture of various materials. It is essential only that the metal value be present in a positively ionized or complexed anionic state in the solution. Since alkaline solutions tend to react with the extractants of the invention resulting in inactivation thereof, it will generally be essential to employ acidic, acidified, or neutral solutions. In any event, it will be understood that there will be first produced a neutral or acidic aqueous solution of the metal values to be recovered.

In accordance with the invention, the metal value to be recovered is extracted from the acidic aqueous phase by means of an organic extractant phase comprising an organic derivative of pyrophosphoric acid and an organic diluent solvent. The pyrophosphate extractants of the invention may be represented by the general formula:

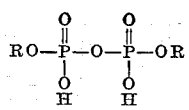

wherein R can be aliphatic, naphthenic or aromatic chain substituents, i. e., pyrophosphoric acid esters of aliphatic, cyclo-alkyl or aromatic alcohols. In practice, dialkyl derivatives including dibutyl, diamyl, dihexyl, diheptyl, dioctyl, dinonyl, didecyl, etc., pyrophosphates up to a chain length of at least 17 carbon atoms in both the normal linear chain and isomeric forms are suitable. Other dialkyl derivatives including cyclo-alkyl or longer or shorter chain lengths as well as mixed derivatives may also be found suitable provided solubility in the aqueous phase is low, solubility is good in the organic phase and excessive emulsification or other troublesome phenomena do not occur. In many cases, it has been noted that extraction efficiency increases with increase of chain length, at least to the decyl derivatives; however, the increase of extraction efficiency above octyl is rather small. Therefore, the dioctyl, dinonyl, and didecyl pyrophosphate derivatives have been most extensively employed; however, it is to be understood that the other extractants described above also are comprehended in the present invention and yield generally comparable extractive results. It is advantageous to employ freshly prepared material. The names of the indicated extensively employed materials may be abbreviated O. P. P. A., N. P. P. A., and D. P. P. A., respectively.

Kerosene and Stoddard solvents have been found to be excellent solvents for use as a diluent with these alkyl pyrophosphoric ester extractants. However, many other materials are satisfactory including petroleum materials such as diesel oil, aromatic oils, distillates, various commercial organic solvents, and petroleum ethers. Benzene, chlorobenzene, toluene, hexane, chlorinated aliphatic hydrocarbons, and ethers are also suitable with the selection of any particular solvent being made generally on the basis of economic considerations. In view of the diverse nature of the aforesaid solvents, it will be apparent that materials other than those specified will also be found suitable. Generally speaking, the characteristics of the solvent-diluent are not critical, although particular solvents will be found to possess advantages under certain conditions. Concentrations of extractant in the diluent can range from about 0.05 to pure extractant insofar as occurrence of extraction phenomena alone is concerned. However, from the standpoint of practical operations concentrations in the range of about 0.10 to 20% by weight represent reasonable operating limits and are therefore preferred. With high concentration of the extractant in the diluent or with pure extractant the high viscosity of the extractant phase makes handling and contacting operations difficult, if not impossible. Also, losses of extractant into the aqueous phase become exorbitant and entrainment may cause poor metal recoveries. Other advantages are also obtained and difficulties eliminated through the use of the diluent.

In performing the actual extraction, any suitable method of promoting contact between the aqueous and extractant phases may be employed. Phase ratios in the range of about 1:1 to 20:1 aqueous to organic are usually satisfactory. It will be appreciated that concentrations of the extractant in the organic phase and the phase ratio are interrelated and that the particular choice of values for these variables will depend on a variety of factors including solubilities of the relevant materials, losses, recovery, level desired, etc. Large-scale operations may be conducted either batch-wise or continuously in countercurrent extractor or efficient mixer-settler type units; however, as it is convenient to employ single-stage extractive techniques in evaluating and illustrating the process, the data presented herein will often relate to results obtained with such single-stage extraction techniques. In general, the single-stage extractions were performed by contacting the acidic aqueous phase and extractant phase with vigorous agitation, for one minute or more, thereby obtaining equilibrium conditions. The phases were then separated and recovery and/or analytical processes performed to ascertain composition of the extracts.

In evaluating and describing the results, it is convenient to employ certain conventionalized and simplified distribution coefficient terms. Such terms are derived as follows:

For conservation of mass the following will be true:

$$C_H = C_O V_O / V_A + C_A$$

wherein:

$C_H$ is the concentration of the extracted material in the original aqueous solution (head or feed material).
$C_O$ is the concentration of the material in the organic extractant phase.
$C_A$ is the uranium concentration in the aqueous phase.
$V_O$ is the volume of the organic phase.
$V_A$ is the volume of the aqueous phase.

The distribution coefficient usually can be determined only approximately from the results of a single extraction as analyses may not be performed with the required degree of precision. Such coefficient is more accurately ascertained by determining the isotherm from a number of experiments at different phase ratios and measuring the slope of the isotherm curve. The isotherm is obtained by plotting either $C_O$ vs. $C_A$ or $C_A$/volume fraction of extractant in the organic phase, vs. $C_A$. In the first case the slop is $K_D$, in the second case the slope is $K^*$.

The magnitude of the extraction can be indicated either as the percentage of uranium extracted or by a distribution coefficient as follows:

Percentage of material extracted is calculated from the expression $$100\left(1 - \frac{C_A}{C_H}\right)$$

and is therefore a function of the ratio of the organic and aqueous phases. Valid comparisons of extractions performed under different conditions are obtainable by comparing the curves obtained by plotting percentage extracted against this volume ratio. Values for percentage extraction are meaningless without consideration of the volume ratio.

The distribution coefficient, $K_D$, is the ratio of the concentration of the material in the organic to that in the aqueous phases (e. g., phosphoric acid phase), i. e., $K_D = C_O/C_A$. In the case where the isotherm (plot of $C_O$ vs. $C_A$) is linear, $K_D$ is independent of volume ratio and $K_D$ alone is a valid criterion of the magnitude of extraction. With uranium as the extracted material and alkyl pyrophosphate extractants in dilute solutions, the isotherms were found to be concave toward the $C_A$ axis and not linear as for alkyl phosphates as disclosed in the aforesaid copending application. However, in more concentrated extractant solutions the isotherms are linear.

$K_D$ is a function of the concentration of an alkyl phosphate extractant in the organic phase as may be demonstrated by plotting $K_D$ against the volume fraction of extractant in the organic phase. With the alkyl phosphate extractant materials disclosed in the said copending application, when the slope of the curve of the plotted values is linear, i. e., $K_D$/volume fraction of extractant in the organic phase, $K_D$ is a value dependent on neither the phase ratios nor the concentration of extractant. This value is given the designation $K^*$ and represents the coefficient for the distribution of pure material into undiluted extractant.

As noted hereinbefore, with dilute solutions of dialkyl pyrophosphates, the isotherms are not linear, but are concave toward the $C_A$ axis. It is believed that this is the result of the extractant phase becoming saturated with uranium. This situation is analogous to gas adsorption in a monomolecular layer, a problem which has been treated by Langmuir. Following the same reasoning, an equation for the present case is derivable as follows:

$$K^* = K^*_{max} - K^*_{max} C^*_O / C^*_{max}$$

where $K^*$ is the coefficient for the distribution of a material into undiluted extractant; $K^*_{max}$ is the maximum (i. e., intercept) value of $K^*$; $C^*_O$ is the concentration of extracted material in the pure extractant and is equivalent to $C_O$/volume fraction of extractant in the extractant phase; and $C^*_{max}$ is the saturation value of $C^*_O$. Accordingly, $K^*$ vs. $C^*_O$ in rectangular coordinates should be a linear plot wherein the intercept on the $C^*_O$ axis is $C^*_{max}$. The foregoing also strongly suggests that different reaction mechanisms are involved in extractions by alkyl pyrophosphates relative to those of alkyl phosphates.

An equation relating the percentage recovery in a multistage process to the distribution coefficient for the case of a linear isotherm has been disclosed by R. E. Treybal, in "Liquid Extraction," first edition, McGraw-Hill Book Co., Inc., New York, 1951, at page 174. With appropriate revision of symbols the following equation is obtained relating the recovery of $r$ stages when the feed extractant contains no metal value:

$$\frac{\text{Percent extracted}}{100} = \frac{(K_D V_O / V_A) A + 1 - (K_D V_O / V_A)}{(K_D V_O / V_A) A + 1 - 1}$$

wherein $V_O/V_A$ is the ratio of flow rates of organic extractant to aqueous phase.

As noted above, the extractants of the invention are generally useful in treating neutral or acidic aqueous solutions of the metal values to be recovered. Such extractants are especially useful for the recovery of uranium, thorium, and other metal values of the actinide elements, lanthanide elements and other elements capable of providing multi-positive ions in the disclosed solutions. Generally speaking, metallic elements soluble in said solutions yielding multi-positive ions are adapted to extractive treatment with the extractants of the invention as will be described in detail hereinafter.

Since the principles involved in the treatment of various applicable materials will generally be similar to those relevant to the recovery and purification of uranium, for simplicity the present disclosure will be largely directed to the production and treatment of uraniferous solutions; however, as such solutions may often be of exceedingly complex composition, the typical behavior of multitudinous materials will become apparent by consideration of the disclosed examples. Uranium, a material of vast commercial and strategic importance, is found within the United States, almost exclusively in low-grade ores. The present invention allows efficient and economic recovery of such uranium and, potentially, of other valuable metals and therefore will find enthusiastic acceptance in mineral recovery technology.

The uranium present in such ores may be leached or dissolved by a great variety of known methods yielding aqueous solutions amenable to treatment in accordance with the present invention. For example, phosphatic ores are treated with mineral acids, as in the production of phosphoric acid and phosphate fertilizers, yielding suitable solutions. Moreover, a wide variety of uraniferous ores such as pitchblende, monazite, carnotite, shale, Florida Leached Zone material, etc., can be leached with mineral acids and/or other reagents to recover the uranium therefrom. Uranium and other desired materials will obviously be found in a great many other aqueous solutions processed in industry which solutions are often amenable to treatment in accordance with the invention.

Extraction of the desired metal value, e. g., uranium, into the extractant phase is usually favored by low acid concentrations. At high acid concentrations, e. g., with HCl and $H_2SO_4$, extraction or retention in the aqueous phase may be favored.

For purposes of illustration uranium can be recovered from an industrial phosphoric acid derived by the leaching of phosphate rock and having the following typical composition. The principles disclosed with reference to the extractability of particular materials and with this particular aqueous solution apply generally to the other materials contemplated by the invention.

ACID COMPOSITION

| | | |
|---|---|---|
| Phosphate | g./liter | 500– 600 |
| Uranium ($U_3O_8$ equivalent) | mg./liter | 100– 150 |
| Sulfate | g./liter | 25– 55 |
| Ferrous iron | g./liter | 0.04–0.35 |
| Ferric iron | g./liter | 5– 8 |
| Fluoride | g./liter | 16– 25 |
| Siliceous material | g./liter | 2– 7 |
| Sp. gr. | | 1.2–1.36 |
| E. M. F. (volts vs. S. C. E.) | | 0.2 to –0.45 |

Practicable recovery of uranium is possible with even lower uranium content. With higher uranium content the recovery is virtually total. In the event that the solution is obtained at some stage in a regular industrial process, e. g., the above noted industrial phosphoric acid manufacture, the treated solution can be returned thereto once the desired metal is extracted therefrom.

When processed under ordinary conditions, uranium will be present in such solutions in the uranyl state. With the extractants disclosed in the aforesaid copending application, it is usually necessary to reduce the solution to place the uranium in the tetrapositive, uranous state, which is much more easily extracted. With the extractants of the present invention, the extraction efficiency is so greatly improved that reduction can usually be avoided. However, reduction of the solution to produce ions, including those having more positive charges, does improve extraction with the present agents and often aids in minimizing extraction of lesser ionized impurities.

Two beneficial results are therefore obtainable by reduction of the phosphoric acid solutions as commercially produced. The reduction places the uranium in the tetravalent ionic state, $U^{+4}$, which is much more easily extracted than uranium as $UO_2^{++}$, i. e., the hexavalent state. Also, iron and other impurities are less easily extracted in the reduced state and the extracted uranium is therefore contaminated less therewith. Where uranium content is very low and phosphate concentration is high, i. e., above about 20–25% concentration, the reduction step may be essential for efficient recovery of uranium even with the present agents. A similar situation exists for other elements which may exist in various ionization states in the processed solutions.

A convenient method for determining the oxidation state of the acid, i. e., the mass equilibrium oxidation state of all the dissolved materials, is to measure the oxidation potential developed between a Pt and a standard calomel electrode (S. C. E.) immersed in the solution. The relation between the oxidation potential of acid of the foregoing composition and the ratio of ferrous to ferric iron has been determined to vary in accordance with the following equation:

$$E_0 = -0.200 + 0.06 \log 10 \, (Fe^{+2})/(Fe^{+3})$$

The potential for synthetic phosphoric acid was found to be similar; however, $E_0$ in this case was –0.210 volt.

Iron, aluminum, zinc, $Na_2S_2O_4$, $TiCl_3$, and others are satisfactory reducing agents for treating the solution. Electrolysis also is feasible; however, very low current densities must be employed. Accordingly, electrolysis is not too satisfactory for large-scale operations. Preferably, iron is employed in a particulate form disposed in a column through which the solution is passed, in the absence of oxygen. Consumption of iron is reduced and the efficiency of the reduction increased if the iron is first washed with dilute HCl. The improvement obtained by reducing the solution is illustrated in Fig. 2 of the drawing, wherein there is plotted the log $K^*$ vs. E. M. F. for phosphoric acid solutions reduced to various levels. As may be seen therein $K^*_{max}$ increases by a factor of over twenty fold as the solution is reduced from $-0.300$ to $0.0$ volt. Accordingly, lower extractant concentrations in the organic phase are required for equivalent extraction from reduced solutions.

It will be noted that the solution described above contains substantial amounts of fluoride. Such fluoride, particularly if present as fluoride ion, $F^-$, reduces the extractability of uranium from some solutions. Siliceous materials added to the solution eliminate the deleterious effect of such fluoride. Such siliceous material should be supplied in amounts sufficient to complex all of the fluoride present. Silicofluoride present in the solution has little effect upon extractability; therefore, conversion of the fluoride to this innocuous material avoids interference by fluoride ions. Storage in glass vessels, contact with glass wool or finely divided siliceous material such as diatomaceous earth and addition of soluble siliceous materials are all effective in eliminating the deleterious effect of the fluoride.

Variations in phosphate concentration for crude phosphoric acids of the character described do not materially affect extraction, e. g., with octyl pyrophosphoric acid-kerosene solutions, as indicated by studies in the region of 21–51% $P_2O_5$. However, for synthetic phosphoric acid solution, i. e., less complex compositions, there is an inverse linear relationship between $K^*$ and phosphate concentration in the region of 10–30% $P_2O_5$. The reason for the inconsistent behavior is not apparent. Variations in the concentrations of other acid radicals may produce similar results; moreover, with certain acids if sufficiently concentrated, with high ratios of aqueous to organic phase and low concentrations of extractant, extraction into the aqueous phase may be favored. Elevated temperatures lower the extraction efficiency, rapidly destroy the extractant and are therefore to be avoided. Temperatures below about 30° C. are preferred.

Extractions with solutions of various concentration, i. e., over the range of 1 to 10% of octyl pyrophosphoric acid (O. P. P. A.) in kerosene, obtained from points on the lower linear portion of the isotherm, indicate that $K_D$ is a linear function of the concentration of O. P. P. A. and thus that $K^*_{max}$ is a constant relative to dilution of extractant in this range. From acidic phosphatic solutions of the character described only the uranium and iron are extracted in appreciable amounts. The extracted uranium is always found to be in the tetravalent state whether the phosphoric acid is reduced or not. Typical extracts obtained with O. P. P. A. and kerosene from the described phosphoric acid contain uranium in an amount of about 0.7 g./l. and 0.7 g./l. of iron if from unreduced acid. Iron content is lowered to about 0.2 g./l. if the acid is reduced. With other acid solutions the extracted uranium is sometimes found in the hexavalent state.

Generally speaking, the more positive charges a metal ion carries, the more easily the metal is extracted from an aqueous solution by the extractants of the invention. Ions with single positive charges, such as $Na^+$, $K^+$, etc., are not extracted to any appreciable extent. Ions carrying a double positive charge, including those of the second group of the periodic system, e. g., $Ca^{++}$, $Mg^{++}$, etc., as well as such ions as $Fe^{++}$ are extracted to only a limited extent; however, tripositively charged ions of higher atomic weight such as $Fe^{+++}$ and those of the lanthanide and actinide elements including cerium are extracted with high efficiency while the lower atomic weight elements of this group are extracted with lesser efficiency. Tetrapositive ions of heavy metal elements such as $Th^{+4}$, $U^{+4}$, and other highly charged ions of the actinide series of elements are extracted with the highest distribution coefficients. Dipositive ions of the uranyl type, $UO_2^{++}$, exhibit anomalous behavior in that very substantial extractions are obtained; however, the extract is often found to contain the uranium in a reduced, i. e., tetrapositive state. An undetermined metal value extractant compound (e. g., uranium-O. P. P. A.) appears to be formed in the aqueous phase or at the interface and dissolved in the extractant phase during the extraction process.

In view of the preferential extraction of various metal values as indicated in the foregoing, it is apparent that the extraction step may be employed to effect a substantial purification from mixtures of the more positively ionized and, therefore, better extracted metal value. Moreover, in those cases in which the ions of an element may exist in two or more positive ionization states, control of the ionizaiton state will determine the extractability of such an element. Therefore, the element may be made to remain in the acid solution by appropriate treatment while another element is preferentially extracted. Oxidation and reduction, as well as other appropriate treatment, may be employed for this purpose. Iron is an example of such an element since iron in the dipositive ionic state extracts poorly while tripositive iron extracts quite well. In the presence of uranium in the acidic solution reduction of the solution as described above simultaneously lessens the extractability of the iron and greatly enhances the extractability of the uranium yielding uranium products less contaminated with iron. Subsequent to separation of the extract from the acid solution, the uranium can be recovered therefrom by a variety of methods disclosed hereinafter. Similar methods will operate for the recovery of various other metal values from extracts obtained in similar extractant processes with other aqueous solutions of the character described. Lanthanide and actinide elements generally may be expected to behave similarly to uranium in view of the behaviors predicted by the lanthanide-actinide series, hypotheses. In any event the extracts may be treated destructively with basic precipitation, evaporation, and/or calcination, etc., to yield solid products containing the desired metal value.

*Method A.—Precipitation with HF*

Uranium is recovered from such extracts, for example, O. P. P. A.-kerosene extracts, by contact with aqueous HF, whereby the uranium precipitates as a fluoridic material. For a 1% O. P. P. A.-kerosene extract, 99% of the uranium is precipitated with HF equivalent to 1.25 pounds per pound of $U_3O_8$. Precipitates are obtained for all HF solutions above about 3% concentration; however, stable emulsions difficult to separate form below about 20% concentration. Concentrations of HF above about 50–60% adversely affect the extractant.

Only a very short contact time is required for precipitation of the uranium. Time periods of 15 seconds mixing and 1 minute settling before separation of the phases are sufficient. The precipitate is then filtered and dried. Short contact times are very desirable since long contact time promotes rapid deterioration of the extractant. The extractant should also be recycled as soon as possible to lessen the deteriorative process.

The following are analyses of precipitates obtained from similar reduced and unreduced acids and which precipitates were dried at 100° C.:

|  | Reduced Acid, percent | Unreduced Acid, percent |
|---|---|---|
| $U_3O_8$ | 64.5 | 50.3 |
| $F^-$ | 25.8 | 22.4 |
| $PO_4$ | 7.2 |  |
| Fe | 0.3 | 1.26 |
| Al | 0.6 | 0.11 |

The amount of HF required is dramatically reduced in many cases and the efficiency of the precipitation is improved if concentrated phosphoric acid is added to the aqueous HF precipitant. $H_3PO_4$ of above about 60% concentration and in a maximum amount of about 10% of the extract volume is combined with the HF precipitant and the mixture employed as in the case of the aqueous HF solution. In this case the precipitate product will comprise uranous phosphate. The beneficial effect of adding the concentrated $H_3PO_4$ appears quite specific since numerous other tested materials fail to yield a similar result. These methods will behave likewise with at least the lanthanide and actinide elements whose fluorides are insoluble.

Method B.—Precipitation with alcohol

When such extracts are shaken with alcohol, particularly, methyl and ethyl alcohols, the uranium precipitates as a gelatinous green solid. This is believed to be caused by unreacted alkyl pyrophosphate being preferentially extracted by the alcohol resulting in the precipitation of uranium-alkyl pyrophosphate compound therefrom. The precipitate is filtered from the solution and the uranium recovered therefrom by ignition to form a uranium phosphate material. After dilution with water the octyl pyrophosphoric acid can be re-extracted from the alcohol and recycled. The alcohol is recovered from the water mixture by distillation and may be recycled also. This method may be expected to operate likewise with the majority of extracted materials of the character described.

Method C.—Precipitation with ammonia

Ammonia, as either anhydrous gas or aqueous solutions thereof, precipitates uranium from the extract; however, aqueous ammonia sometimes forms stable emulsions and the precipitate is difficult to filter; therefore, anhydrous ammonia is generally preferred. Only small amounts of ammonia are required. The precipitate usually is low-grade in uranium and further processing is required to upgrade the product. Most of the alkyl pyrophosphate appears in the precipitate.

Following removal of the uranium from the extract, such extract is recyclable following replenishment with alkyl pyrophosphoric acid as required. This method may be expected to operate with all extracted materials which are known to form hydrous oxides, hydroxides, and compounds such as diuranates which are insoluble in ammoniated solutions.

Method D.—Precipitation with ammonium fluoride salts

Ammonium bifluoride solutions, e. g., saturated solutions thereof, precipitate uranium from the extract somewhat similarly to the action of HF. Appreciably more reagent, based on the HF content, is required than when HF is added as 48% or 60% HF solution. Ammonium fluoride-ammonium bifluoride mixture salt solutions likewise precipitate uranium from such extracts. Recycle of the extractant is possible after contact with these reagents.

Lanthanide and actinide elements may be expected to behave similarly to the uranium in this method.

Method E.—Reduction and precipitation with HF (or fluoride salts)

Leach liquors obtained with certain mineral acids, e. g., $H_2SO_4$, contain the uranium in the hexavalent oxidation state. Uranium extracted from such solutions is often, at least partially, in the hexavalent state in the extractant and may not be precipitated therefrom with HF. In these cases, such precipitation may be effected by contacting the extract with a reducing agent either before or simultaneously during contact with the HF solution. $H_3PO_4$ may be used in conjunction with the reducing agent and HF to improve the recovery. Fluoride salts may be substituted for HF as described above.

Method F.—Stripping with HCl solutions

The uranium ($U^{+6}$) present in the organic extractant phase can be removed therefrom by a stirripping extraction step utilizing HCl in high concentrations. Various conventional methods may be utilized to recover the uranium from such an HCl solution, e. g., precipitation as a diuranate with ammonia.

Method G.—Cyclic process yielding uranium, aluminum, and phosphate

Certain ores containing large amounts of aluminum with the uranium can be leached with hydrochloric acid and the filtered leach liquor is contacted with a pyrophosphoric extractant phase to remove the uranium. Such uranium may then be recovered from the residual leach solution as above.

The aluminum is then precipitated by saturating the leach solution with HCl gas yielding a precipitate of $AlCl_3$ which is filtered from the solution, dried, and sublimed to produce anhydrous $AlCl_3$ or the $AlCl_3$ is calcined to produce $Al_2O_3$. HCl is then boiled from the residual solution and may be recycled to precipitate the aluminum from other leach solutions. In the event that undesirable amounts of phosphate appear in the $AlCl_3$ precipitate, the material is redissolved in HCl and re-precipitated; however, zirconyl or titanium chloride can also be added to the redissolved material to precipitate the phosphate quantitatively before the precipitation of the aluminum. Phosphate remaining in the original leach solution could be recovered if desired by precipitation or other methods known in the art and utilized, e. g., in fertilizer manufacture.

PREPARATION OF EXTRACTANTS

Best extraction efficiencies are obtained with freshly prepared extractants and especially with materials prepared by a preferred method. The conventional methods employed in producing esters of orthophosphoric acid consists in reacting an alcohol with $P_2O_5$. Within a range of mole ratios of about 4:1 to 2:1, alcohol to $P_2O_5$, mixtures of mono- and di-alkyl phosphoric acids are formed. At a mole ratio of 2:1, alcohol to $P_2O_5$, it has been found that alkyl pyrophosphoric acids are the principal product. With ratios of less than about 2:1, alcohol to $P_2O_5$, viscous products, probably including polymetaphosphates and polypyrophosphates, are produced. Products made by the direct reaction of $P_2O_5$ and alcohol are greatly inferior to those obtained as below.

Pyrophosphoric acid extractants of the invention are prepared in the preferred process, as fololws: The $P_2O_5$ is slurried with a diluent which may comprise the solvent to be utilized in the extraction process and the alcohol is added to the slurry at a rate such that excessive heating does not occur. Optimum extraction properties are obtained with about 2:1 mole ratios of alcohol to $P_2O_5$, the values being of the order of at least twice those obtained with materials prepared in accordance with the above-described modified commercial preparations or by direct addition of the alcohol to $P_2O_5$. Also, the maximum distribution coefficients are obtained when the $P_2O_5$ slurries in solvent diluent, e. g., kerosene, benzene, or ether, contained 0.1 to 0.2 g. of $P_2O_5$ per ml. of solvent. It is preferable to employ the extractant within hours or at most after a few days storage at low temperatures to obtain best results.

Specific details of the process of the invention will become apparent by consideration of the following examples:

EXAMPLE I

Phosphoric acid having the analyses indicated in the following table was employed in this example (proportions in g./l.):

TABLE I

|        | Lot I   | Lot II  |
|--------|---------|---------|
| $U_3O_8$ | 0.104   | 0.104   |
| $V_2O_5$ | 2.27    | 1.73    |
| $P_2O_5$ | 255     | 269     |
| F      | 14.8    | 20.1    |
| Si     | 2.4     | 3.76    |
| Fe     | 3.3     | 3.23    |
| $SO_4$ | 17.5    | 10.7    |
| E. M. F. | −290 mv. | −360 mv. |

Figure 3:
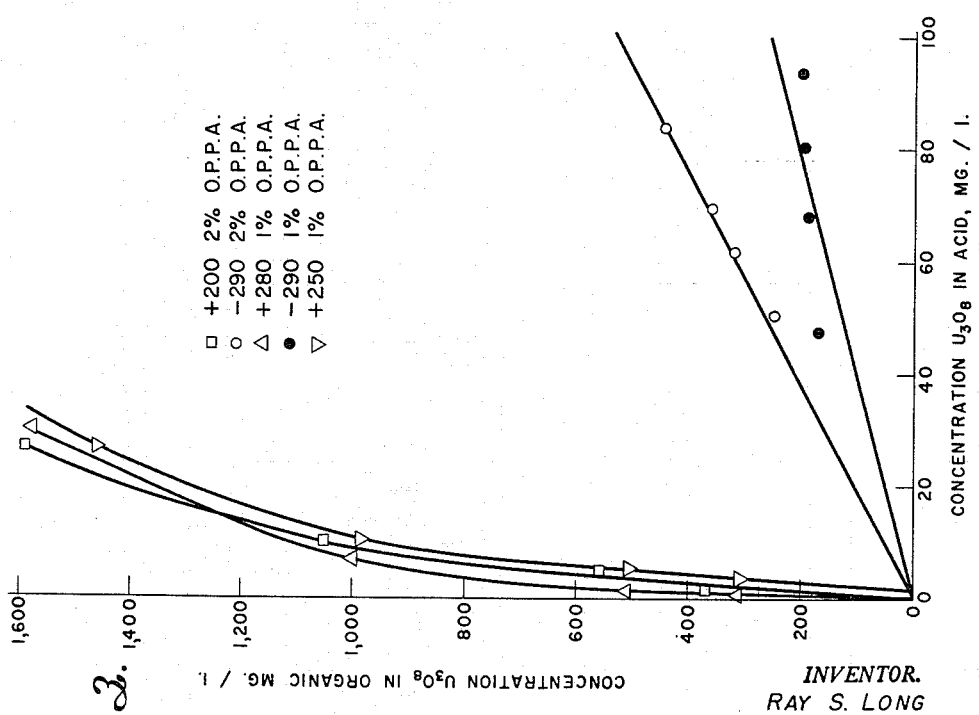
Figure 3 is a graphical illustration of equilibrium isotherms obtained in the extraction of uranium with two different pyrophosphoric acids from phosphoric acid solutions reduced to various oxidation states.

Portions of the solutions were reduced by contact with iron to a positive E. M. F. and reduced and unreduced portions were contacted with extractants dissolved in kerosene in the concentrations indicated in Table II and with the resulting uranium extraction equilibrium isotherms indicated in Fig. 3 of the drawing:

TABLE II

| Lot | Symbol | E. M. F. mv. | Extractant, percent O. P. P. A. |
|-----|--------|--------------|--------------------------------|
| 1   | □      | +200         | 2                              |
| 1   | ○      | −290         | 2                              |
| 1   | △      | +280         | 1                              |
| 1   | ◉      | −290         | 1                              |
| 2   | ▽      | +250         | 1                              |

EXAMPLE II

Continuous countercurrent extraction of a slightly reduced industrial phosphoric acid (reduced to the range of −0.27 to −0.24 v.—S. C. E. vs. Pt) was performed in a four stage mixer settler unit with a phase ratio of 10:1 acid to organic. The acid contained 92 mg. $U_3O_8$ per liter and was reduced by contact with iron particles. The volume of each mixer was about 600 ml. and each settler about 1 liter with each settler containing about 100 ml. of organic phase. The acid was introduced at a flow rate of 150 ml./min. at a temperature of 40° C. while the organic phase, consisting of kerosene with 14 g./l. of O. P. P. A. dissolved therein, was introduced with a flow of 15 ml./min.

The extractant utilized herein was prepared, typically, with a 2:1 mole ratio of capryl alcohol to $P_2O_5$ by adding 272 grams of 95% capryl alcohol to an agitated slurry of 141 gm. of $P_2O_5$ in 1.41 liters of kerosene. After ½ hr. agitation the reaction mixture was diluted to 2 liters and then mixed with additional kerosene to form the extractant phase.

The product was collected as individual 300 ml. portions of extract from the first stage settler, 1 ml. analytical portions removed, the uranium precipitated with 2 ml. of 48% HF, the precipitate filtered from the solution and the remaining, approximately 290 ml. of kerosene, was reconstituted and recycled. Precipitated product was pulped in acetone, filtered, washed, and dried at 100° C.

About 10 hours of operation were required to achieve steady state operation during which state 95% of the U was recovered as a 0.95 g./l. extract. HF precipitation, as described above, was about 95% efficient whereby about 0.05 g. $U_3O_8$/liter remained in the extract; however, this residual material represents only a minor loss since the depleted extract is recycled.

The composite product had the following analysis:

| Analysis: | Percent |
|-----------|---------|
| $U_3O_8$  | 44.8    |
| F         | 22.7    |
| Fe        | 3.66    |
| $PO_4$    | 4.05    |
| Ca        | Trace   |
| Al        | Trace   |
| Loss on ignition | 34.7 |

EXAMPLE III

Figure 4:
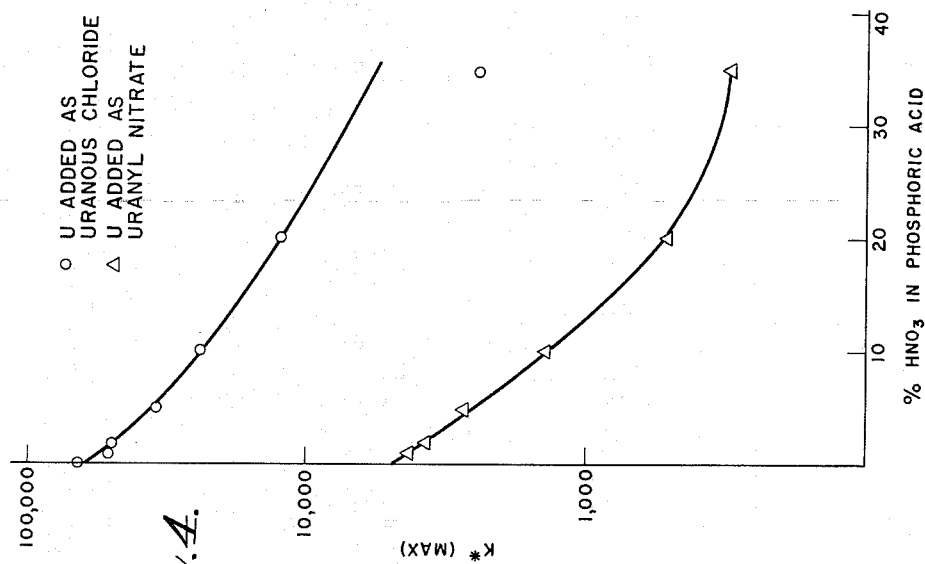
Figure 4 is a graphical illustration of the effect obtained by varying the concentration of nitric acid in a phosphoric acid solution on the extraction of $U^{+4}$ and $U^{+6}$ therefrom with octyl pyrophosphoric acid.

Uranium was recovered from synthetic acidic phosphatic solutions corresponding to 30% of $P_2O_5$ and $HNO_3$ varying from 1 to 35%. Uranium was added to a part of each solution as uranous chloride and to the remainder as uranyl nitrate in amounts equivalent to 100 mg. $U_3O_8$/l. Extractions were made immediately after the uranium was added using kerosene solutions of O. P. P. A. which latter was obtained by the reaction of 2:1 mole ratio of capryl alcohol to $P_2O_5$. Ten different volume ratios of aqueous acid to organic phase were employed with each solution to determine the extraction isotherm with resultant values of $K_{max}^*$ for uranium determined therefrom being plotted relative to the nitric acid concentration in Fig. 4 of the drawing.

As may be noted therefrom, the $K_{max}^*$ values obtained with solutions containing U(IV) are ten to twenty times larger than those containing U(VI). Recovery of U from either the indicated U(VI) or U(IV) solution would be economical; however, impurities if present in such solutions often tend to lower the extraction efficiencies and therefore reduction of the solution may be required in the cases where $K_{max}^*$ for U(VI) is unduly low.

EXAMPLE IV

Leached zone ore which occurs in association with Florida phosphate rock was subjected to leaching with nitric acid yielding a leach solution with the following analysis:

| Analysis: | G./l. |
|-----------|-------|
| $U_3O_8$  | 0.176 |
| $P_2O_5$  | 117   |
| $NO_3$    | 249   |
| CaO       | 60    |
| $Al_2O_3$ | 5.1   |

Figure 5:
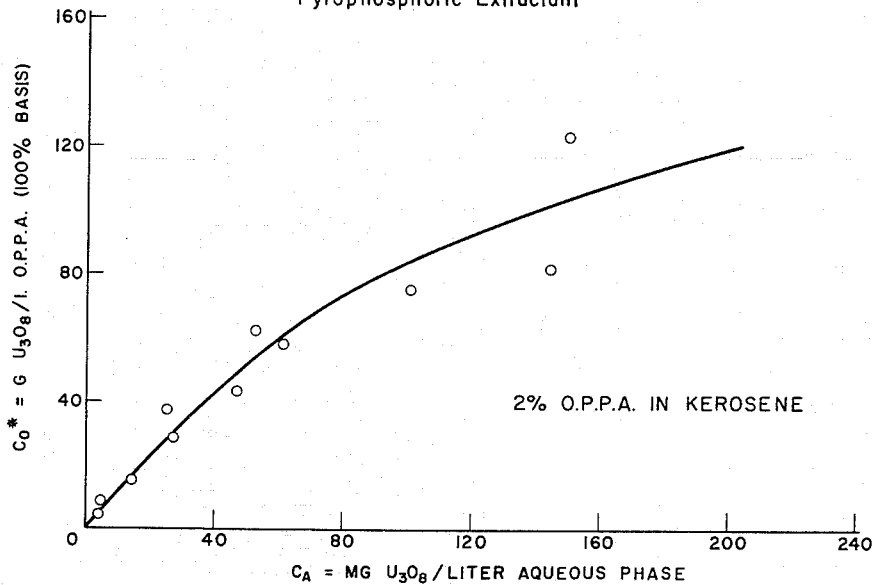
Figure 5 is a graphical illustration of isotherms for the distribution of uranium between aqueous nitric acid leach solution and alkyl pyrophosphoric acid extractant.

Uranium extraction isotherms were determined for this solution using 2% O. P. P. A. in kerosene with eleven volume ratios of aqueous to organic phase with the results illustrated in Fig. 5. The U concentration in the organic phase in this plot is computed on the basis of 100% extractant so that the value of $K^*$, the distribution coefficient into pure extractant, is obtained directly. The isotherm has the curvature usually noted with this extractant.

Figure 6:
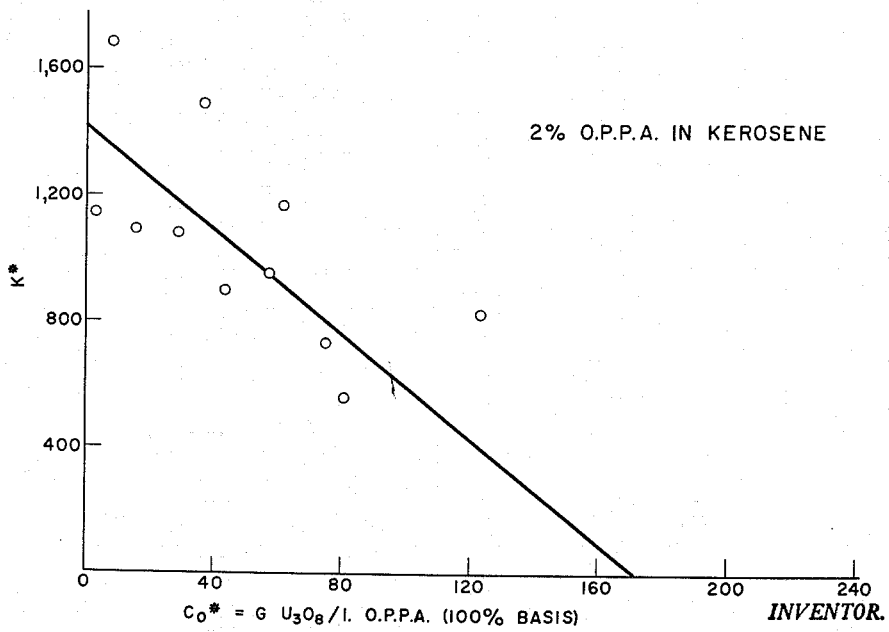
Figure 6 is a graphical illustration of the relation between $K^*$ versus $C^*_0$ for the distribution of uranium between a nitric acid leach solution and octyl pyrophosphoric acid extractant.

In order to illustrate the effectiveness of extraction under the conditions noted the $K^*$ values are plotted versus the concentration of uranium in the organic phase in Fig. 6. Limiting values of about 1400 for $K^*$ and 170 g./l. of $U_3O_8$ in undiluted O. P. P. A. indicate economical uranium recovery is feasible with concentrations as low as 1.5 to 2% of extractant in kerosene.

Nonyl pyrophosphoric acid prepared from diisobutyl carbinol employed in continuous countercurrent operations under conditions similar to those of this experiment indicated a practical advantage in that solids did not accumulate in the organic phase.

EXAMPLE V

A leach liquor was produced from a high lime Florida leached zone ore by contacting the ore at 80° C. with 30% $HNO_3$ and a ratio of $HNO_3$ to $P_2O_5$ content of the ore of 1.9. 22% $H_2SO_4$ was added at a ratio of $H_2SO_4$ to ore $P_2O_5$ of 0.35 and the solid material was filtered from the solution followed by a single displacement wash. (Ca and other materials soluble in the solution are precipitated thereby.) The filtrate leach solution had the following analysis:

| Analysis: | G./l. |
|-----------|-------|
| $U_3O_8$  | 0.174 |
| $NO_3$    | 181   |
| $PO_4$    | 175   |
| $Al_2O_3$ | 43.5  |

Uranium extraction isotherms were determined with this solution using 2% O. P. P. A. in kerosene. The K value at a 10:1 aqueous to organic phase ratio was about 10 corresponding to a K* value of 500. A plot of K* vs. $C_O$ for the run indicated a limiting value of about 1500. These values indicate a high recovery feasibility on this unreduced leach liquor in a multistage extraction system.

EXAMPLE VI

Uraniferous Chattanooga shale was roasted at 500° to 600° C. and then leached with 2% $H_2SO_4$ at a phase ratio of 1 g. acid/g. shale for 2 hours at room temperature. The solids were filtered from the solution yielding a leach liquor containing 62.5 mg. $U_3O_8$/liter which liquor was extracted at 25° C. and a phase ratio of 5:1 aqueous to organic with O. P. P. A. in kerosene having concentrations and with the results indicated in the following table:

TABLE

| O. P. P. A., Percent | K | Percent $U_3O_8$ Recovered |
|---|---|---|
| 5 | 175 | 97.4 |
| 2 | 31.5 | 87.2 |
| 1 | 15.3 | 77.4 |

EXAMPLE VII

A leach liquor obtained from leached zone ore as described above was extracted with a 2% solution of nonyl pyrophosphoric acid in kerosene to produce an extract containing 1560 mg. $U_3O_8$/liter. Washed (aqueous) and unwashed portions of this extract were contacted with 24% HF solution containing sufficient $FeSO_4$ to reduce the uranium to the +4 oxidation state with a phase ratio of 10:1 organic to aqueous to strip and precipitate the uranium therefrom. The uranous fluoride precipitate obtained thereby was filtered and dried with over 95% recovery in each case. The washed and unwashed extract products assayed 36.1 and 35.1% $U_3O_8$, respectively.

EXAMPLE VIII

High lime leach zone ore was treated as above with 2.1 lbs. $HNO_3$ and 0.85 lb. $H_2SO_4$ per pound of $P_2O_5$ in the ore yielding leach solution T-5 with the composition indicated in the following table. Similarly, a second leach liquor was prepared using 1.0 lb. $HNO_3$ and 0.8 $H_2SO_4$ per lb. $P_2O_5$ in the ore yielding leach liquor T-6. A portion of the latter was further acidified to yield an $HNO_3/P_2O_5$ ratio of 2, yielding liquor T-6H.

TABLE

| | T-5, g./l. | T-6, g./l. | T-6H, g./l. |
|---|---|---|---|
| $U_3O_8$ (+6) | 0.130 | 0.130 | 0.110 |
| $P_2O_5$ | 133 | 147 | 123 |
| $Al_2O_3$ | 53 | 74 | |
| $NO_3$ | 60 | 147 | 225 |
| CaO | 45 | 24.6 | |
| $SO_4$ | | 3.3 | |

Figure 7:
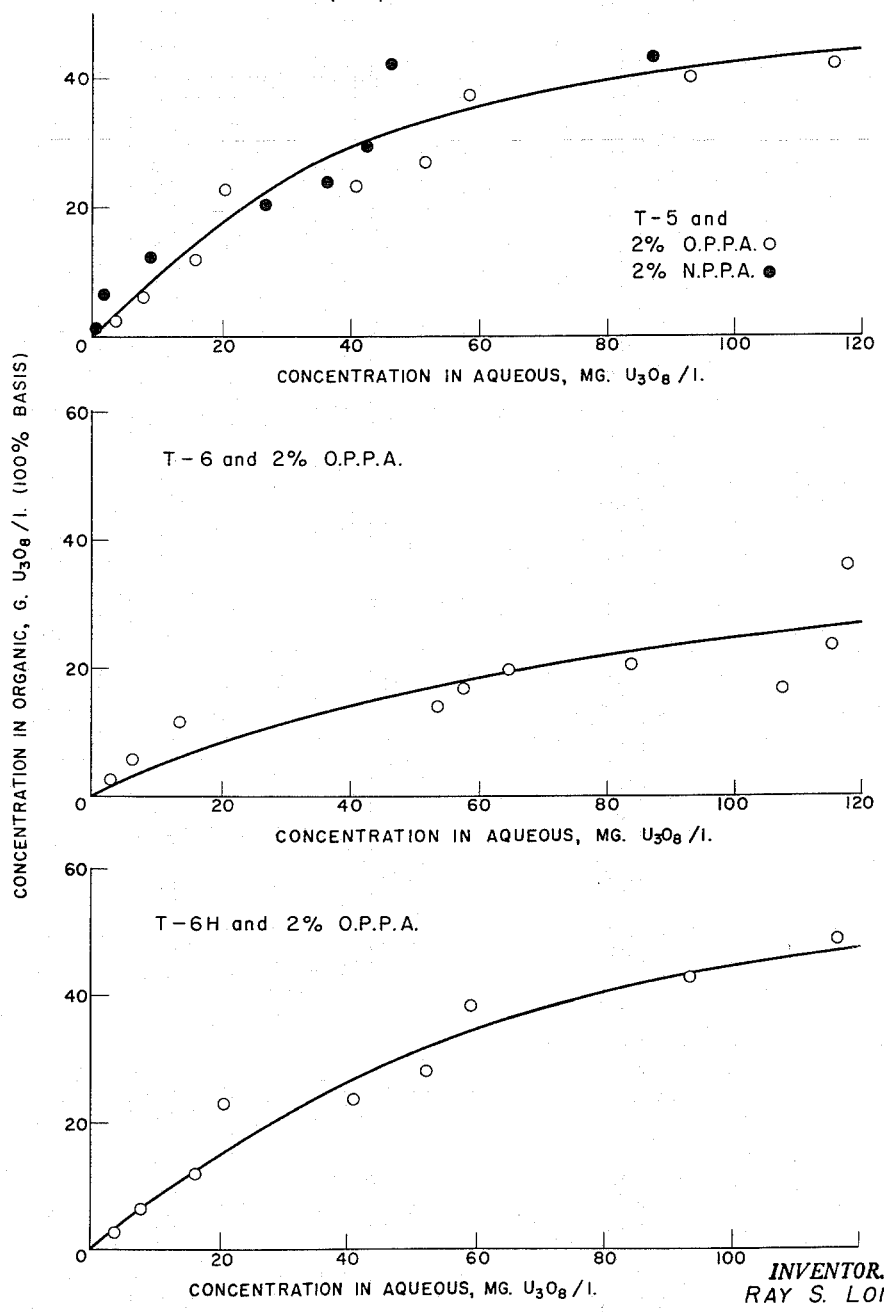
Figure 7 is a graphical illustration of the isotherms for the distribution of uranium between mineral acid leach solution and pyrophosphate extractants.

Isotherms were determined for the distribution between the above solutions and 2% O. P. P. A. (made from capryl alcohol) in kerosene with the results indicated in accompanying Fig. 7. Results with similar extractions using N. P. P. A. are also indicated therein.

Plots of K* vs. concentration in the organic phase indicated the following limiting values of K* and $C_O$.

| | K* (Limiting value 100% basis) | $C_O^*_{max}$ (Limiting Concentrations in 100% O.P.P.A.) |
|---|---|---|
| T-5 | 1,000 | 76 g. $U_3O_8$ |
| T-6 | 290 | 80 g. $U_3O_8$ |
| T-6H | 840 | 80 g. $U_3O_8$ |

These practical operating values are typical of those obtained with a wide variety of high and low lime ores and leach liquors of widely varying composition obtained therefrom. A process utilizing the extractants of the invention and designed for a single set of conditions may therefore be utilized with little or no modification with a wide variety of ores.

Figure 8:
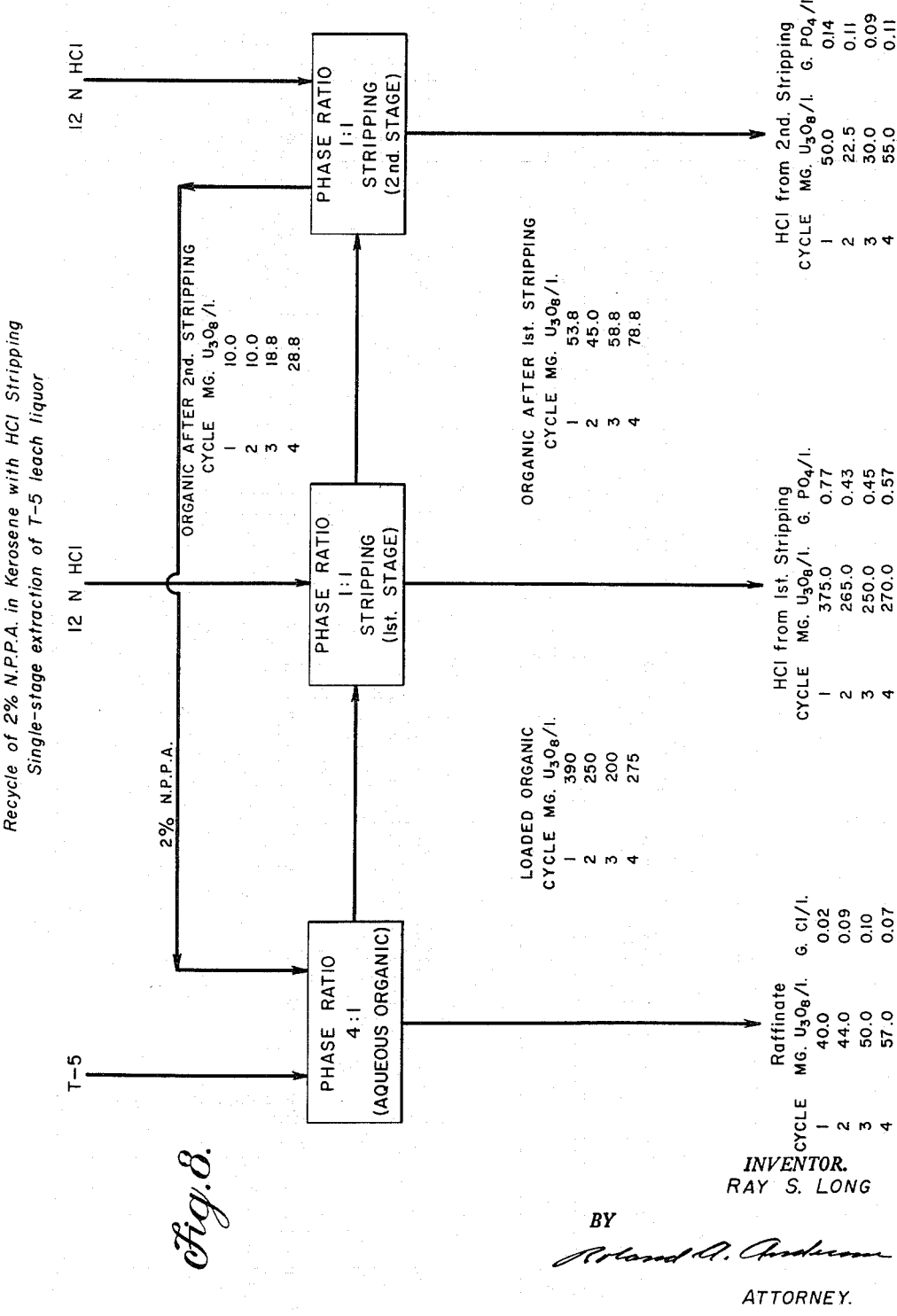
Figure 8 is a flow sheet illustrating a pyrophosphoric acid extractant process for recovering uranium from an aqueous leach liquor.

The leach liquor T-5 was also employed in a process wherein 2% N. P. P. A. in kerosene was contacted therewith in a single stage with a 4:1 phase ratio, aqueous to organic. The uranium was then stripped from the extract with two successive portions of 12 N HCl in 1:1 phase ratios and the stripped organic phase was recycled without makeup with the operation proceeding through 4 cycles and with the analysis of the various streams illustrated in the diagram of Fig. 8.

The following extraction coefficients were computed from these data:

| Cycle | Extraction into 2% N.P.P.A. | | Extraction into 12 N HCl | |
|---|---|---|---|---|
| | $K_D$ | K | $K\frac{a}{0}$ 1st stage | $K\frac{a}{0}$ 2nd stage |
| 1 | 9.7 | 485 | 7.0 | 5.0 |
| 2 | 5.7 | 285 | 5.9 | 2.3 |
| 3 | 4.0 | 200 | 4.2 | 1.6 |
| 4 | 4.8 | 240 | 3.4 | 1.9 |

O. P. P. A. as well as other pyrophosphoric acids may be expected to yield similar results.

In connection with the foregoing it may be noted that the value of $$K\frac{a}{0}$$

of uranium between 2% O. P. P. A. in kerosene extracts and 12 N HCl is about 26 at room temperature and 40 at 0° C. Low concentrations of HCl are ineffective; however, with 9 N HCl, $$K\frac{a}{0}$$

has a value of about 1 and with 12 N HCl, the value rises to between about 20–40 with phase ratios of 1.2:1 (aqueous to organic).

EXAMPLE IX

1% octyl pyrophosphoric acid in kerosene was used to extract the uranium from a reduced industrial phosphoric acid. 500 cc. of extract obtained by treating 5 liters of such acid containing 0.104 g./l. of $U_3O_8$ was contacted with 2 g. of 48% HF yielding a precipitate weighing 0.95 g. and assaying 38% $U_3O_8$. The precipitate was washed with 30 cc. of 50:50 acetone water mixture which was subsequently found to contain 30 mg. $U_3O_8$ per liter. The resulting material balance follows:

|  | G. $U_3O_8$ |
|---|---|
| Feed acid | 0.5 |
| Effluent acid | 0.03 |
| 1% O. P. P. A. ext | 0.47 |
| Product | 0.38 |
| Wash | 0.0009 |
| Unaccounted for | 0.02 |

EXAMPLE X

Ammonium fluoride as a saturated aqueous solution (470 g. $NH_4F \cdot HF$/l.) was contacted with a 1% octyl pyrophosphoric acid in kerosene extract containing 0.73 $U_3O_8$/l. 100 ml. portions of the extract were shaken for 2 minutes with from 6.0 to 30 ml. of bifluoride solution per liter of organic phase with the results indicated in the following table. Less degradation of the extractant than with concentrated HF is noted with this reagent.

TABLE

| $NH_4F \cdot HF$ Sol'n, ml. | g.$NH_4F \cdot HF$/ g.$U_3O_8$ | Residual $U_3O_8$ in organic, mg./l. | $U_3O_8$ Recovery, percent |
|---|---|---|---|
| .6 | 3.8 | 525 | 28.1 |
| 1.0 | 6.4 | 305 | 58.3 |
| 1.5 | 9.7 | 16.0 | 97.8 |
| 2.0 | 12.9 | 12.5 | 98.3 |
| 3.0 | 19.3 | 6.5 | 99.1 |

EXAMPLE XI

Saturated solution mixtures of ammonium fluoride and bifluoride in the ratio of 1:1 to 1:4, respectively, were utilized to precipitate the uranium from an extract containing (1.0 g. $U_3O_8$/l.) with the total volume of solution used being either 10 or 15 ml./l. of organic phase. The reaction appears to be a combination of fluoride precipitation and pyrophosphate neutralization by ammonia. Conditions and results are indicated in the following table:

TABLE

| $NH_4F$ Solution, ml. | $NH_4F \cdot HF$ Solution, ml. | Residual $U_3O_8$ in Organic, mg./l. | Recovery, percent |
|---|---|---|---|
| .5 | .5 | 2.5 | 99.7 |
| .2 | .8 | 16.5 | 98.3 |
| .8 | .8 | 0.0 | 100.0 |
| .3 | 1.2 | 2.0 | 99.8 |

EXAMPLE XII

Ammonium bifluoride was used to remove the uranium from a 1% octyl pyrophosphoric acid in kerosene extract containing 1.07 g. $U_3O_8$/l. 100 ml. portions of this solution were shaken for two minutes with quantities of saturated $NH_4F \cdot HF$ solution ranging from 0.7 to 2.0 ml. After a two minute settling period a 25 ml. portion of the organic phase was contacted with a 100 ml. portion of 30% $P_2O_5$, phosphoric acid containing 220 mg. $U_3O_3$/l. and a portion of the residual acid filtrate was also collected for analysis. Other 100 ml. portions of similarly enriched extract portions were shaken in contact with 1.5 ml. quantities of saturated bifluoride solutions for periods of from 30 seconds to 3 hours and the $K_D$ determined for the various portions with the data and results presented in the following table:

TABLE

| | Precipitation | | | Extraction | | |
|---|---|---|---|---|---|---|
| $NH_4F \cdot HF$ Solution, ml. | Shaking Time | $U_3O_8$ Residual, mg./l. | $U_3O_8$ Recovery | $U_3O_8$ Aqueous, mg./l. | $U_3O_8$* Organic, mg./l. | $K_D$ |
| 0 | | | | 10.8 | 837 | 78 |
| 0.7 | 2 min | 83 | 92 | 24.9 | 863 | 35 |
| 1.0 | 2 min | 36 | 97 | 72.3 | 628 | 8.7 |
| 1.3 | 2 min | 19 | 98 | 115 | 439 | 3.8 |
| 2.0 | 2 min | 4 | 99 | 125 | 384 | 3.1 |
| 1.5 | 30 sec | 6 | 99 | 113 | 434 | 3.8 |
| 1.5 | 2 min | 6 | 99 | 118 | 414 | 3.5 |
| 1.5 | 10 min | 12 | 99 | 140 | 332 | 2.4 |
| 1.5 | 30 min | 8 | 99 | 158 | 256 | 1.6 |
| 1.5 | 3 hrs | 22 | 98 | 135 | 362 | 2.7 |

*Includes residual uranium from precipitation operation.

As may be noted, the uranium recovery from the organic increased as the bifluoride was increased. 10 ml. of bifluoride solution/liter of extract was sufficient for 99% recovery. $K_D$ for re-extraction decreased; however, the distribution coefficient on repeated extraction decreased only from about 100 to 60.

EXAMPLE XIII

A commercial phosphoric acid of the general character described above was concentrated to about one half the original volume by evaporation. The concentrated acid contained about 940 g. $PO_4$/liter (ca. 42% $P_2O_5$). The acid was reduced with various amounts of iron and extracted with octyl pyrophosphoric acid made with a 3:1 mole ratio of capryl alcohol to $P_2O_5$. Ten volume ratios of acid to organic were used in extractions to determine each isotherm with the results indicated in the solid curve of Fig. 9 of the drawing. A similar plot for 30% $P_2O_5$ acid is represented by the dashed curve of Fig. 9 ($K^*_{max}$ vs. E. M. F.). A single isotherm determined for an octyl pyrophosphoric acid made with a 2:1 mole ratio of capryl alcohol to $P_2O_5$ is indicated near the dashed curve.

It may be noted therefrom that an extractant made with a 3:1 ratio of alcohol to $P_2O_5$ is decidedly poorer in extracting the uranium from more concentrated phosphoric acids while that made with a 2:1 ratio of alcohol to $P_2O_5$ is about equivalent in either the concentrated or less concentrated phosphoric acids. This data is in agreement with other experiments indicating that phosphate concentration has little effect on extractions with O. P. P. A. as compared with octyl phosphoric and other alkyl phosphoric acids.

EXAMPLE XIV

Phosphatic leach zone ore which occurs in conjunction with Florida phosphate rock was leached with hydrochloric acid and alumina and uranium recovered therefrom. Leaching with HCl may be done in various manners, either with roasted or natural ore.

In a typical fashion 200 gm. of the ore was leached for one hour at 110° C. (reflux temp.) and the cake was filtered from the leach solution. The filtrate was contacted with a 5% solution of an O. P. P. A. solution made with a 2:1 ratio of capryl alcohol to $P_2O_5$ in kerosene. A graphical plot of $K^*$ vs. $C_0$ derived from the results is shown in Fig. 10 of the drawing. With the values shown, uranium can be recovered from such a solution with little difficulty.

Residual leach solutions prepared similarly to the above allow recovery of the aluminum and phosphate in a cyclic process. For example, a first portion of the ore, e. g., 200 grams, is leached as above, filtered and washed with three portions of water (twice with 100 ml. and once with 200 ml.). The first wash may be used to prepare the 6 N HCl leach used in the next cycle with a fresh 200 g. of ore while the second wash can be used as the first wash in the second cycle to improve recovery while the third wash is discarded.

Aluminum chloride is precipitated from the leach solution following uranium extraction as described above by saturation with gaseous HCl. The precipitate is filtered and washed with 200 ml. of 12 N HCl, dissolved in 200 ml. of 6 N HCl and reprecipitated with gaseous HCl. The final cake is also washed with 12 N HCl yielding quite pure aluminum chloride with minor phosphate contaminant. HCl is then boiled from the leach solution for use as an aluminum chloride precipitant and a portion of the residual 6 N HCl is used as new leach solution. Such leach solutions contain about 80 to 90% of the uranium, 70 to 80% of the $P_2O_5$, 60 to 70% of the $Al_2O_3$, and 60 to 70% of the $Fe_2O_3$ of the ore. The precipitated aluminum chloride is calcined with or without chlorine recovery to produce $Al_2O_3$ usable in aluminum manufacture. Phosphate can be substantially completely removed from the 6 N HCl solutions by precipitation with either zirconyl or titanyl ions (chloride salt). The residual leach solution contains a considerable concentration of phosphoric acid which may be recovered by suitable treatment.

EXAMPLE XV

Leached zone ore was leached with nitric acid and iron was added to portions to determine the effect on the extraction therefrom. Solutions having the tabulated compositions were produced:

TABLE

| Component: | |
|---|---|
| $U_3O_8$ | mg./l 121 |
| $P_2O_5$ | g./l 67.5 |
| $NO_3$ | do 372 |

A 5% solution of O. P. P. A. made with a 2:1 mole ratio of capryl alcohol to $P_2O_5$ in kerosene was used to extract the uranium from the leach solution. Four isotherms were run; one with the untreated solution and the others with various amounts of iron added. The results are tabulated below:

TABLE

| g. Fe added/l. | E. M. F. (Pt vs. S. C. E.) | $K^*_{max}$ | $C_{O max}$ |
|---|---|---|---|
| | V. | | |
| 0 | −0.930 | 2,700 | 64 |
| 1 | −0.890 | 2,270 | 63.5 |
| 2 | −0.890 | 1,700 | 63.6 |
| 5 | −0.860 | 1,500 | 53 |

From the foregoing it may be noted that the iron did not reduce the valence state of the uranium but decreased the capacity of the extractant for U. (Reduction of U would presumably have increased the extractability.)

EXAMPLE XVI

Natural leach zone ore was leached with $HNO_3$ with a high slurry density yielding a leach solution of the following composition:

| Component: | Content |
|---|---|
| $U_3O_8$ | mg./l 192.7 |
| $P_2O_5$ | g./l 100.3 |
| $NO_3$ | do 372 |
| Fe | do 6.36 |
| Al | do 35.4 |

A distribution isotherm was determined by using seven different volume ratios of leach solution and 5% O. P. P. A. in kerosene as the extractant yielding values of $K^*_{max}$ of 2400 and $C_{O max}$ of 112 g. $U_3O_8$/liter of O. P. P. A.

EXAMPLE XVII

Uranium obtained in the above-mentioned nitric acid leaches is believed to be present in the +6 oxidation state. Therefore, recovery of U from organic pyrophosphoric acid extracts by precipitation with HF requires reduction. When such an unreduced extract is shaken with HF no precipitate is formed. A synthetic extract was prepared by dissolving 2.2 g. $U_3O_8$/l. as uranyl in 3% O. P. P. A. extractant. Portions were contacted with commercial $H_3PO_4$ (30% $P_2O_5$) containing 7 g. Fe/l. at −0.1 v.(S.C.E. vs. Pt) and C. P. $H_3PO_4$ (30% $P_2O_5$) containing 5 g. Fe/l. at +0.2 v. both at 4:1 phase ratio (acid:extract). Addition of 4 ml. of 48% HF precipitated the uranium leaving only about 160 and 92 mg. $U_3O_8$/liter, respectively, in the barren extract.

EXAMPLE XVIII

A 2% O. P. P. A. in kerosene extract obtained from nitric acid leach of leach zone material was treated for the recovery of the uranium. Such extract had the following composition:

| Component: | Content, g./l. |
|---|---|
| $U_3O_8$ | 1.05 |
| $PO_4$ | 5.1 |
| $NO_3$ | 2.6 |
| Al | 1.3 |
| Fe | 0.13 |

A series of precipitations were performed by a single contact with aqueous solutions of HF, $FeSO_4$, and $H_3PO_4$ in amounts in the range of from 1 to 5 lbs. per lb. of $U_3O_8$. The data are presented in the table. The tabulated data indicate that satisfactory recovery of the U can be obtained with less than 5 lbs. of such reagents per lb. $U_3O_8$.

TABLE

*Recovery of uranium from 2% O. P. P. A. extract using a combination of HF, $FeSO_4$, and $H_3PO_4$.*—All experiments were performed with 30 ml. portions of O. P. P. A. (2%) containing 1.050 g./l. $U_3O_8$.

| Volume, 48% HF (ml.) | Weight, $FeSO_4 \cdot 7H_2O$ (g.) | Volume of 20% $H_3PO_4$ (ml.) | $U_3O_8$ Left in Filtrate (g./l.) | Percent $U_3O_8$ Ppt'd. | g./l. $U_3O_8$ K* Second Usage [1] |
|---|---|---|---|---|---|
| 0.12 | 0.2 | 0.18 | 0.574 | 46 | 300 |
| 0.24 | 0.2 | 0.36 | 0.541 | 50 | 133 |
| 0.48 | 0.2 | 0.72 | 0.208 | 80 | 118 |
| 0.24 | 0.1 | 0.36 | 0.550 | 48 | 320 |
| 0.24 | 0.4 | 0.36 | 0.593 | 44 | 190 |

[1] Determined with single extraction at 10-to-1 (aq./org.) original K*, first usage, was 860.

EXAMPLE XIX

A nitric acid leach liquor made from a high lime leach zone ore was extracted with 2% O. P. P. A. made from capryl alcohol with a 1:4 phase ratio of organic to leach liquor. After separation, the extract contained 768 mg. $U_3O_8$/liter corresponding to a $K_D$ value of 13 or a K* value of 260. The extract was stored at 0° C. between subsequent stripping experiments.

Isotherms were determined for the distribution of uranium between 2% O. P. P. A. in kerosene at 12 N HCl at 0 and 25° C. yielding average coefficients of $$K\frac{a}{0}$$

of about 26 at room temperature and about 40 at 25° C.

EXAMPLE XX

2% $H_2SO_4$ was used to leach uraniferous Chattanooga shale at a 1:1 phase ratio yielding a leach solution with the following composition:

| Component: | Content |
|---|---|
| $U_3O_8$ | g./l 0.0768 |
| $SO_4$ | do 23 |
| $PO_4$ | do 6.9 |
| Ca | do 0.66 |
| Al | do 0.10 |
| Fe | do 1.7 |
| pH | 1.3 |

The leach liquor was extracted with various concentrations of O. P. P. A. in kerosene, shaking time of 1 minute and phase ratio of 5:1 aqueous to organic with the following tabulated results indicating good recovery values:

TABLE

| O. P. P A. Conc. | K. Conc. org./Conc. aq. | Percent $U_3O_8$ Extracted |
|---|---|---|
| 5% | 44.0 | 89.8 |
| 2% | 11.0 | 68.7 |
| 1% | 7.5 | 60.0 |

While in the foregoing there have been described what may be considered to be preferred embodiments of the invention, modifications may be made therein without departing from the spirit of the invention, and it is intended to cover all such as fall within the scope of the appended claims.

What is claimed is:

1. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, and precipitating the uranium from said extractant phase with an agent selected from the group consisting of aqueous HF, alcohol, ammonia, fluoride salt solutions, and reducing agent with soluble fluorides.

2. In a proces for recovering uranium values from a solution formed with a solvent selected from the group consisting of water and phosphoric, nitric, hydrochloric, and sulfuric acids, the steps comprising extracting said uranium from the solution with an extractant phase containing a symmetrical dialkyl pyrophosphate in which the alkyl substituents have a chain length in the range of 4 to 17 carbon atoms and an organic diluent, contacting the extract obtained thereby with about a 20 to 50% aqueous HF solution to precipitate the uranium, and separating the precipitate from the solutions.

3. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with about a 20 to 50% aqueous HF solution to precipitate the uranium, separating the HF and extract phases, separting the precipitate from the solution, and recycling the extract with appropriate replenishment.

4. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with an alcohol selected from the group consisting of methyl and ethyl to precipitate the uranium, separating the precipitate from the solutions, separating the extract and alcohol phases, diluting the alcohol phase with water, extracting alkyl pyrophosphate from the alcohol solution with organic diluent forming new extractant phase with the recovered alkyl pyrophosphate, and recycling the new extractant phase.

5. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with ammonia to precipitate the uranium, and separating the precipitate from the solutions.

6. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with a solution of fluoride salts to precipitate the uranium, and separating the precipitate from the solutions.

7. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with a reducing agent and soluble fluoride to precipitate the uranium, and separating the precipitate from the solution.

8. In a proces for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with a concentrated HCl stripping solution to transfer the uranium therein, and recovering the uranium from the stripping solution.

9. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with a concentrated HCl stripping solution to extract the uranium therein, adsorbing the uranium from the stripping solution extract with a strongly basic anion exchange resin, eluting the uranium from the resin, and recovering the uranium from the eluate.

10. In a process for recovering uranium values from a solution formed with a solvent selected from the group consisting of water and phosphoric, nitric, hydrochloric, and sulfuric acids, the steps comprising extracting said uranium from the solution with an extractant phase comprising a symmetrical dialkyl pyrophosphate in which the alkyl substituents have a chain length in the range of 4 to 17 carbon atoms and an organic diluent, contacting the extract obtained thereby with a concentrated HCl stripping solution to extract the uranium therein, and evaporating the solution leaving the uranium in the residue.

11. In a process for recovering uranium values from an acidic phosphatic solution, the steps comprising extracting the uranium from said solution with an extractant phase comprising a symmetrical dialkyl pyrophosphoric acid in which the alkyl substituents have a chain length of within the range of 4 to 17 carbon atoms and an organic diluent, precipitating the uranium from the extract obtained thereby by means of an aqueous reagent solution, and separating the precipitate from the solutions.

12. The process as defined in claim 11 wherein HF solution is the means employed in precipitating the uranium from the extract.

13. The process as defined in claim 11 wherein alcohol is the means employed in precipitating the uranium from the extract.

14. The process as defined in claim 11 wherein ammonia is the means employed in precipitating the uranium from the extract.

15. The process as defined in claim 11 wherein fluoride salt solutions are the means employed in precipitating the uranium from the extract.

16. The process as defined in claim 11 wherein a reducing agent and soluble fluoride in aqueous solution are the means employed in precipitating the uranium from the extract.

17. A process for recovering uranium and aluminum values from an ore containing relatively large amounts of aluminum comprising leaching at least the uranium and aluminum from said ore with hydrochloric acid of below about 9 N, contacting the leach solution with an extractant phase comprising a symmetrical dialkyl pyrophosphoric acid in which the alkyl substituents have a chain length in the range of 4 to 17 carbon atoms and a diluent to extract the uranium therein, recovering the uranium from the extractant phase, saturating the residual leach solution with HCl gas to precipitate aluminum chloride from the solution, and separating the precipitate from the solution.

18. A process for recovering uranium and aluminum values from an ore containing relatively large amounts of aluminum comprising leaching at least the uranium and aluminum from said ore with hydrochloric acid of below about 9 N, contacting the leach solution with an extractant phase comprising a symmetrical dialkyl pyrophosphoric acid in which the alkyl substituents have a chain length in the range of 4 to 17 carbon atoms and a diluent to extract the uranium therein, recovering the uranium from the extractant phase, saturating the residual leach solution with HCl gas to precipitate aluminum chloride from the solution, separating the precipitate from the solution, boiling HCl from the residual saturated HCl solution yielding about a 6 N HCl solution to leach new ore, and utilizing HCl boiled from the solution to precipitate $AlCl_3$ from other portions of leach solution.

19. The process as described in claim 1 but wherein the original solution is contacted with a reducing agent to reduce the uranium to the tetravalent oxidation state prior to contact with said extractant phase.

References Cited in the file of this patent
UNITED STATES PATENTS 2,119,523     Butz ------------------ June 7, 1938

OTHER REFERENCES

Harvey et al.: Jour. of Chem. Soc. (London), 1947 pp. 1020–1021.

Kosolapoff: Organo-Phosphorus Compounds, pp. 350, 368 (1950), publ. by John Wiley & Sons, Inc., N. Y.

Ellis: DOW–81, July 14, 1952, declassified Sept. 29, 1955, pp. 11–71.